United States Patent
Frey et al.

[11] Patent Number: 6,117,405
[45] Date of Patent: Sep. 12, 2000

[54] PROCESS FOR REMOVING NITROGEN OXIDES FROM FLUE GASES

[75] Inventors: Rudolf Frey, Effretikon; Felix Koller, Veltheim, both of Switzerland

[73] Assignee: Von Roll Umwelttechnik AG, Zürich, Germany

[21] Appl. No.: 09/102,432

[22] Filed: Jun. 22, 1998

[30] Foreign Application Priority Data

Jun. 20, 1997 [CH] Switzerland ............................. 1506/97

[51] Int. Cl.[7] .................................................. B01D 53/56
[52] U.S. Cl. ....................... 423/235; 423/210; 423/239.1; 423/240 R; 423/243.01; 423/244.01; 423/244.07
[58] Field of Search ...................... 423/244.01, 244.07, 423/243.01, 235, 239.1, 240 R, 210

[56] References Cited

U.S. PATENT DOCUMENTS

| | | | |
|---|---|---|---|
| 4,294,806 | 10/1981 | Abe et al. ............................. | 423/239 |
| 4,681,746 | 7/1987 | Michalak et al. ..................... | 423/239 |
| 4,812,296 | 3/1989 | Schmelz et al. ...................... | 423/239 |
| 5,233,934 | 8/1993 | Krigmont et al. .................... | 110/345 |
| 5,456,891 | 10/1995 | Fattinger et al. ...................... | 423/210 |
| 5,465,690 | 11/1995 | Viel Lamare et al. ................ | 122/4 D |
| 5,510,092 | 4/1996 | Mansour et al. ..................... | 423/239.1 |
| 5,585,081 | 12/1996 | Chu et al. ............................. | 423/239.1 |

FOREIGN PATENT DOCUMENTS

| | | |
|---|---|---|
| 253 563 A1 | 1/1988 | European Pat. Off. . |
| 600 440 A2 | 6/1994 | European Pat. Off. . |
| 36 34 360 C2 | 3/1988 | Germany . |
| 39 41 894 A1 | 6/1991 | Germany . |
| 60-232237 | 11/1985 | Japan . |
| 61-135531 | 8/1986 | Japan . |
| 4-219124 | 8/1992 | Japan . |
| 8-332341 | 12/1996 | Japan . |

*Primary Examiner*—Steven P. Griffin
*Assistant Examiner*—Timothy C Vanoy
*Attorney, Agent, or Firm*—Cohen, Pontani, Lieberman & Pavane

[57] ABSTRACT

A process is provided for removing contaminants, such as nitrogen oxides, out of exhaust gases, such as gases emitted from an incineration plant. Ammonia or a reducing agent producing ammonia is added to the exhaust gases at a point where the exhaust gases are at a temperature ranging from 700 to 900° C. so that ammonia reacts with and removes nitrogen oxides out of the gases; the gases are passed into a boiler where they are cooled to a temperature ranging from 200 to 350° C. and additional ammonia or reducing agent is injected into the gases; the gases are removed from the boiler and alkaline sorbents, such as alkali metal compounds or alkaline earth metal compounds are injected into the gases, and the gases are passed through a catalyst/filter element coated with a catalytically active oxide or salt of vanadium, chromium, manganese, iron, cobalt, nickel, copper, zinc, tungsten and molybdenum for catalyzing the reduction of residual nitrogen oxides in the flue gases. The gases discharged from the catalyst/filter element may be subjected to a wet scrubbing step to remove sulfur dioxide and/or hydrochloric acid out of the gases.

10 Claims, 1 Drawing Sheet

PROCESS FOR REMOVING NITROGEN OXIDES FROM FLUE GASES

BACKGROUND OF THE INVENTION

1. Field of the Invention

The invention relates to a process for removing nitrogen from combustion flue gases.

2. Discussion of the Prior Art

It is known to feed ammonia to combustion flue gases for removing nitrogen (deNOxing), the nitrogen oxides reacting at a temperature of about 850° C. with ammonia to form nitrogen and water. This process has the disadvantage that high deNOxing efficiencies entail a high ammonia slip. A further disadvantage is the relative high ammonia consumption.

German reference DE 36 34 360 C2 discloses a further process for deNOxing combustion flue gases, in which the flue gases are mixed with $NH_3$, ammonia-containing substances, amines or amine-containing substances, and are then fed at a temperature of 150 to 600° C. through at least one filter element which consists of a ceramic support material and has catalytically active substances that catalyze the reduction of nitrogen oxides. If the combustion flue gases are very highly polluted, which is for example the case with flue gases produced in the incineration of waste, this process can be used only if very short catalyst life is accepted. If operation is even possible, it is very costly. A further disadvantage of this process is that there is very substantial dioxin production because of the high catalyst surface temperature of up to 600° C.

SUMMARY OF THE INVENTION

The object of the present invention is to propose a more effective and less expensive process for deNOxing combustion flue gases.

The object is, in particular, achieved with a process for deNOxing combustion flue gases, in particular flue gases produced in an incineration plant, in which a reducing agent which gives off ammonia at the reaction temperature is added to the combustion gases in the post- combustion, the ammonia-containing flue gases produced in this way being cooled downstream of the post-combustion, the reducing agent being once more added to the cooled ammonia-containing flue gases, and the flue gases treated in this way being subsequently fed to a catalyst element in order to catalyze the reduction of the residual nitrogen oxides.

The object is further achieved, in particular, with a process for deNOxing combustion flue gases which are produced by incineration on a grate, in particular flue gases produced in an incineration plant, in which the combustion process takes place in two stages, with main combustion and post-combustion, a reducing agent, which is ammonia or gives off ammonia at the reaction temperature, being added to the combustion flue gases in the post-combustion, and the ammonia-containing flue gases produced in this way being cooled downstream of the post- combustion, the reducing agent being once more added to the cooled ammonia-containing flue gases, and the combustion flue gases treated in this way being subsequently fed to a catalyst element in order to catalyze the reduction of the residual nitrogen oxides.

The object is achieved with a two-stage process. In a first process step the reducing agent is added to the burnt gases or combustion flue gases in the post- combustion, the ammonia and the nitrogen oxides reacting at temperatures of, for example, about 805° C.±50° C. to form nitrogen and water. After cooling, reducing agent is once more added to these flue gases in a second process step, and the flue gases treated in this way are then fed to a catalyst element. Coarse deNOxing takes place in the first process step, while fine deNOxing takes place in the second process step. One advantage of this process is that the flue gases have small amounts of nitrogen oxide, for example less than 30 ppm, downstream of the catalyst element, for a low residual ammonia slip of, for example, less than 10 mg $NH_3/m^3$.

The process according to the invention has the advantage that the catalysts remain functional over a long period of time and therefore do not need to be replaced, which allows cost-efficient and, in terms of the catalysts, substantially uninterrupted operation of the flue gas cleaning device.

In an advantageous embodiment, the catalyst element additionally comprises a filter element, it also being possible for these two elements to be designed as a filter element which has catalytic substances, as for example disclosed by document DE 36 34 360 C2. In an advantageous embodiment, a catalyst/filter cartridge is used as the filter element.

A further advantage of the process according to the invention is that the catalyst/filter, or the catalyst/filter cartridge, can be designed in a relatively small and compact structure. It is known that the efficiency of a catalyst decreases over time. In plants which use only a catalyst for deNOxing, this catalyst is designed, for example, for an operating period of two years and must therefore be made correspondingly large in order to achieve a sufficiently high deNOxing rate even toward the end of the intended operating period. To date, catalysts require a large reserve capacity, for which reason they have been large and correspondingly of expensive design. A further advantage of the process according to the invention is that the life of the catalyst can be extended in that, when the catalyst efficiency decreases, increased noncatalytic deNOxing is carried out by injecting more ammonia. This makes it possible to delay the replacement of the catalyst.

The process according to the invention has the further advantage that optimum deNOxing is guaranteed even when the waste gas temperatures vary. It is known that the temperature of the waste gas varies downstream of the boiler, owing to contamination of the boiler. In a clean boiler, more heat is drawn from the waste gas than in a contaminated boiler. The temperature of the waste gas influences the conversion rate of the catalyst. Owing to the noncatalytic deNOxing, the variations in the conversion rate of the catalyst due to the temperature of the waste gas only have a slight effect on the deNOxing at the catalyst.

The process according to the invention of the combination of noncatalytic and catalytic deNOxing thus has the following advantages:

- the catalyst/filter can be made smaller and more compact;
- the life of the catalyst can be extended by compensating the reduced efficiency of the catalyst by increased noncatalytic deNOxing;
- the variations in the waste gas temperature have a smaller effect on the conversion rate of the catalyst; and
- the deNOxing as a whole is more cost-efficient to carry out. The use of a catalyst/filter cartridge has the advantage that both dust removal and deNOxing of the waste gas takes place in the same device and in the same process step.

A further advantage of the process according to the invention is that little dioxin formation takes place. On the one hand, the dioxin formation in the flue gases and in the ash is suppressed by the injection of ammonia into the flue gases. In addition, when there is a filter element, dust separation takes place at relatively low temperatures, for which reason scarcely any dioxins can be formed in the dust which is separated. In addition, the catalytically active filter breaks down dioxins. With, downstream of the catalyst element, residual absorption by the addition of active carbon before or during wet flue gas cleaning, further dioxins which may be present are removed. The waste incineration flue gases cleaned with the process according to the invention therefore have very low dioxin levels.

A further advantage of the process according to the invention is that less ammonia is needed for deNOxing the flue gases in comparison with a purely noncatalytic process (SNCR process). In order to reduce a large proportion of the nitrogen oxides, it is always necessary to have excess ammonia in the noncatalytic process (SNCR process). It is not possible to avoid a significant ammonia slip.

In addition to ammonia, ammonia-containing substances or amines, dissolved ammonium salts or ammonium chloride solutions are also suitable reducing agents. The ammonia may be added to the flue gases in the form of gas or in an aqueous solution, in particular in the form of droplets.

In an advantageous refinement of the process, the addition of the reducing agent is controlled in such a way that, in total, minimum ammonium consumption and minimum ammonium slip result, which represents optimum deNOxing in terms of repercussions on the environment.

In an advantageous refinement of the process, active carbon is added to the flue gases downstream of the catalyst element in order to bind the last traces of chlorinated aromatic compounds or metallic mercury.

In a further advantageous refinement of the process, the flue gases are subjected to wet flue gas cleaning downstream of the catalyst element in order to remove acidic pollutants such as $SO_2$ or HCl.

The process according to the invention has the advantage that, on leaving the wet flue gas cleaning, the flue gases meet national regulations governing emission levels, as for example stipulated in the German Federal Antipollution BlmSch 17, so that the flue gases can be discharged via the stack without the hitherto required post-cleaning stage, for example designed as a fabric filter with a metered amount of adsorbent or a fixed coke bed.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWING

The single FIGURE schematically represents the inventive process.

DETAILED DESCRIPTION OF THE PREFERRED EMBODIMENTS

Figure 1:
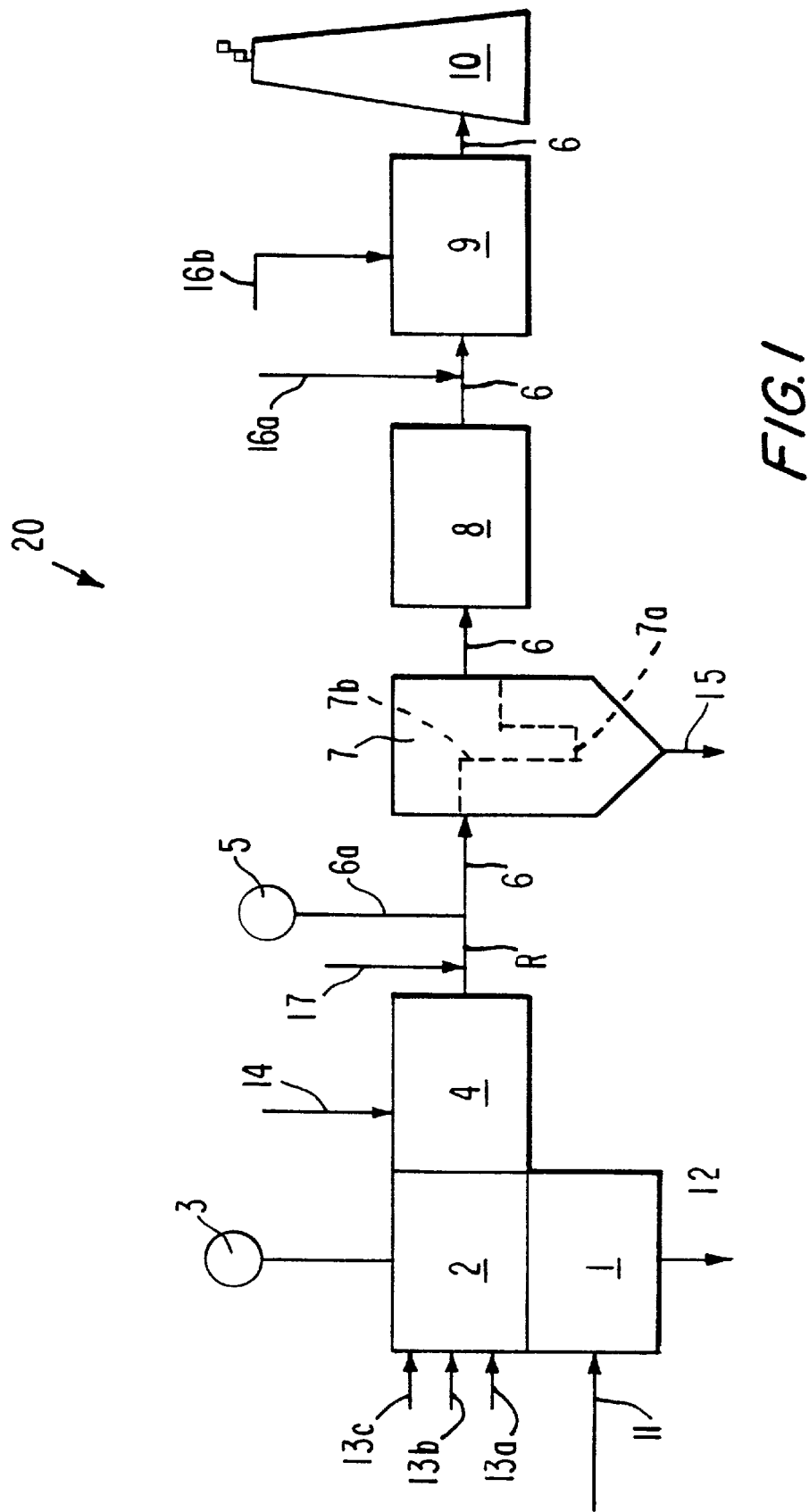

The waste treatment plant 20 according to FIG. 1 has a furnace 1 for incinerating waste 11, and a cleaning device for the flue gases which is arranged downstream of the furnace 1. The waste 11 incinerated with the addition of air produces slag 12 and combustion flue gases R, or flue gases R, which, after passing through various stages and via lines 6, are fed to a stack 10 which discharges the cleaned flue gases Re to the atmosphere in the form of clean gases.

Downstream of the furnace 1, the flue gases R are fed to a post-combustion chamber 2 in which, for noncatalytic deNOxing of the flue gases R, a reducing agent, containing ammonia or compounds which give off ammonia such as ammonia-containing substances, amines or amine-containing substance, is injected. The reducing agent is injected into the post-combustion chamber 2 via feed lines 13a, 13b, 13c at those points where the flue gas temperature is between 700 and 900° C., and preferably at about 850° C. The feed lines 13a, 13b, 13c are arranged at various points in the post-combustion chamber 2, with a temperature measuring device 3 detecting the temperature in the post-combustion chamber 2 and a control device (not shown) managing the addition of the reducing agent in such a way to the variously arranged feed lines 13a, 13b, 13c that the reducing agent is injected in the preferred temperature range.

The post-combustion chamber 2 is designed in such a way that the flue gases R remain in the chamber 2 for a total of about 2 seconds.

Downstream of this noncatalytic deNOxing, the flue gases R are fed to a boiler 4 and cooled therein to a temperature of less than 350° C., preferably to 200 to 350° C. In addition, reducing agent is once more injected into the off gases R in the boiler 4 via a feed line 14, the nozzles being arranged in the boiler 4 so that, in any operating state, the temperature of the flue gases at the injection point is below 850° C. Downstream of the boiler 4, the flue gases R are fed to a catalyst element 7 which comprises a filter element 7b with filter candles 7a that are made of a ceramic support material and are coated with catalytically active substances, in order to catalyze the reduction of nitrogen oxides. Oxides and salts of the elements with atomic numbers 23 to 30, as well as tungsten or molybdenum, are used as the catalytically active substances. This catalyst element 7 with filter 7b makes it possible to remove dust 15 and, due to the ammonia present in the flue gases R, also to deNOx the flue gases R. In addition, a breakdown of gaseous polychlorinated aromatic compounds, for example PCDD, takes place in the catalyst element 7.

The catalyst element 7 may also be designed without filter action, so that in a so-called high dust process, the flue gases R pass through the catalyst element 7 without previous dust removal. The catalyst element must in this case be designed in such a way that it has correspondingly wide free flow channels for the flue gases R in order to prevent clogging.

A device 8 for drawing off heat may be connected downstream of the catalyst element 7, this device 8 drawing off the residual heat which still remains from the flue gases R and cooling the flue gases R down to 160° C. Downstream of this, a wet flue gas cleaning device 9 is connected which absorbs the acidic pollutants such as $SO_2$ or HCl contained in the flue gases R. In order to bind the last traces of chlorinated aromatic compounds or metallic mercury, active carbon can be added via feed lines 16a, 16b directly into the flue gas flow R or into the wet flue gas cleaning device 9.

The amount of ammonia injected can be controlled using different strategies. The injection may, for example, take place as follows: the ammonia is injected via the feed lines 13 in an amount such that partial deNOxing of the flue gases R to about 100 ppm NO, measured using a meter 5 via line 6a, is achieved. The temperature distribution in the post-combustion chamber 2 is measured, and the ammonia is injected, by correspondingly switching to one of the three feed lines 13a, 13b, 13c at those points where the temperature is closest to the optimum temperature of 850±50° C. At the same time, the addition of ammonia into the post-combustion chamber 2 is limited so that at most a 1.5±0.5-fold amount of ammonia, relative to the NO content in the raw gas of the post-combustion chamber 2, is injected. The limitation may also be fixed as a maximum amount of ammonium, or rendered dependent on the temperature measurement in the post-combustion chamber 2.

Through the second ammonia addition via the feed line 14, the ammonia content of the flue gases upstream of the catalyst element 7 is increased to an extent such that the flue gases upstream of the catalyst element 7 have a stoichiometric amount of ammonia relative to the nitrogen oxides, measured using the meter 5. In order to achieve a minimum ammonia slip, the stoichiometry factor may also be less than one, for example 0.66 times the stoichiometric amount.

With a control concept of this type, it is possible to achieve residual deNOxing of the flue gases R of for example less than 30 ppm NO, for a residual ammonia slip of less than 10 mg $NH_3/m^3$.

The second ammonia injection via the line 14 may also be arranged after the meter 5.

Besides the represented meter 5, further meters for measuring the concentration of ammonia and nitrogen oxide may be arranged, for example in the post-combustion chamber 2, in order to manage the addition of reducing agent with even better control.

In addition, it is possible to use the emission measurement system conventionally arranged upstream of the stack, in order for example to compensate for a decreasing catalyst efficiency through increased deNOxing in the post-combustion chamber 2.

In a further illustrative embodiment, a dry absorbent is added to the waste gas R upstream of the catalyst/filter 7, as represented by the arrow 17. Alkaline absorbents are suitable as the absorbent, that is to say alkalis, alkali metal compounds or, for example, alkaline earth metal compounds. In this illustrative embodiment, the catalyst/filter 7 is particularly advantageously designed as a filter with internal dust recirculation, as for example disclosed in document EP 476 300 A1. The following processes take place in the catalyst/filter 7:

removal of dust from the waste gas R;

residual deNOxing of the waste gas R by the catalyst;

absorption of acidic components in the waste gas R, for example HCl, HF or $SO_2$ on the alkali absorbent, for example CaO or $NaHCO_3$ and adsorption of mercury and dioxins on, for example, sulfur-doped active carbon.

It is in this way possible to clean the waste gas R comprehensively in a very cost-efficient way.

The invention is not limited by the embodiments described above which are presented as examples only but can be modified in various ways within the scope of protection defined by the appended patent claims.

What is claimed is:

1. A process for removing pollutants comprising nitrogen oxides from combustion exhaust gases emitted from an incinerator plant containing a main combustion stage and a post combustion stage, comprising:

adding an ammonia producing reducing agent to the combustion flue gases in the post combustion stage where the flue gas temperature is between 700 and 900° C. so that the ammonia reacts with the nitrogen oxides in the flue gases;

passing the flue gases into a boiler where the flue gases are cooled to a temperature of 200 to 350° C. and where additional ammonia producing reducing agent is injected into the flue gases;

adding an alkaline earth metal compound sorbent or alkali metal compound sorbent into the flue gases, and passing the flue gases through a catalyst/filter element coated with a catalytically active oxide or salt of vanadium, chromium, manganese, iron, cobalt, nickel, copper, zinc, tungsten and/or molybdenum for catalyzing the reduction of residual nitrogen oxides in the flue gases.

2. The process of claim 1, wherein the ammonia producing reducing agent is added to the post combustion stage in an amount that is at most double the stoichiometric amount relative to the nitrogen oxides in the combustion flue gases.

3. The process of claim 1, wherein the ammonia producing reducing agent is added to the post combustion stage when the flue gas temperature is 850° C.

4. The process of claim 1, wherein the ammonia producing reducing agent is added to the boiler in such an amount that the combustion flue gases have at most a stoichiometric amount of ammonia relative to nitrogen oxides at a point directly upstream of the catalyst/filter element.

5. The process of claim 4, wherein the ammonia producing reducing agent is added to the boiler in such an amount that the combustion flue gases have at most 0.66 times the stoichiometric amount of ammonia relative to the nitrogen oxides at a point directly upstream of the catalyst/filter element.

6. The process of claim 1, wherein the ammonia producing reducing agent is in the form of a gas or an aqueous solution.

7. The process of claim 6, wherein the ammonia producing reducing agent is in the form of droplets.

8. The process of claim 1, further comprising the step of adding activated carbon to the combustion flue gases downstream of the catalyst/filter element.

9. The process of claim 8, further comprising the step of subjecting the combustion flue gases to wet cleaning to remove sulfur dioxide and/or hydrochloric acid out of the combustion flue gases at a point downstream where the activated carbon is added to the combustion flue gases.

10. The process of claim 1, wherein the catalyst/filter element is coated with an oxide or salt of tungsten or molybdenum.

* * * * *